M. J. GREELEY.
CHAIN COUPLING DEVICE.
APPLICATION FILED JAN. 13, 1912.
1,042,667.
Patented Oct. 29, 1912.
2 SHEETS—SHEET 1.
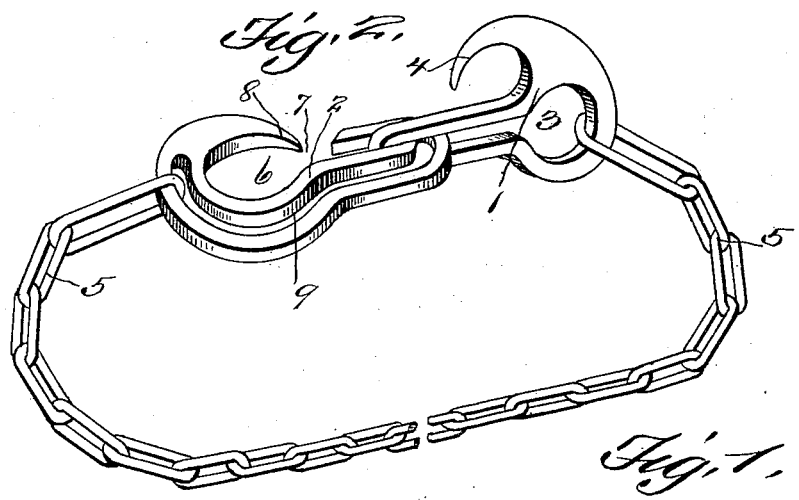
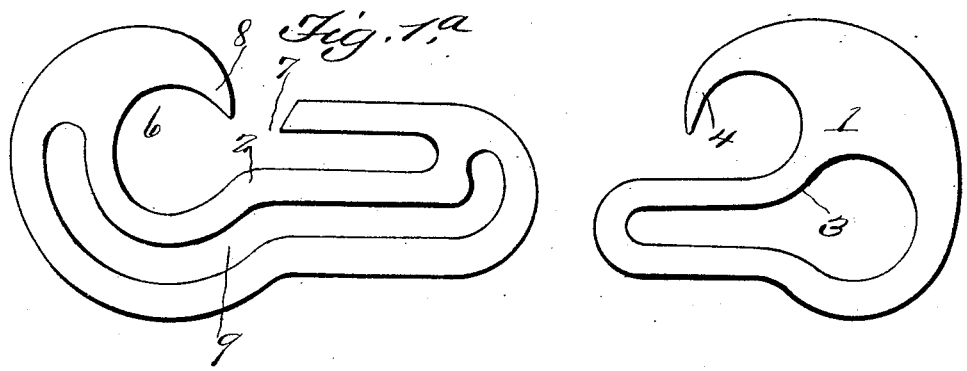
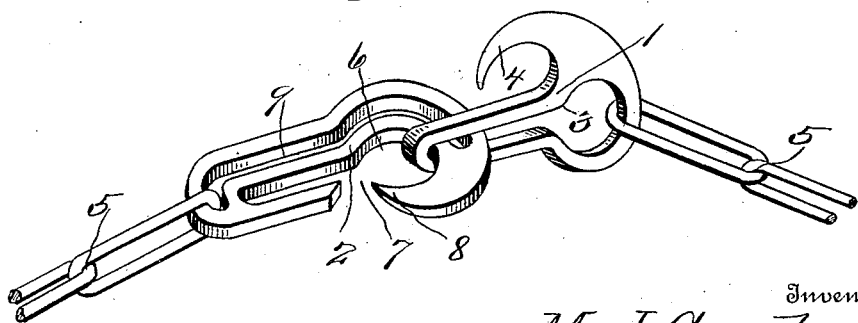
Witnesses
Francis J. Boswell,
C. E. Frottingham.
Inventor
M. J. Greeley,
By D. Swift & Co.
Attorney M. J. GREELEY.
CHAIN COUPLING DEVICE.
APPLICATION FILED JAN. 13, 1912.
1,042,667.
Patented Oct. 29, 1912.
2 SHEETS—SHEET 2.
Fig. 4.
Fig. 5.
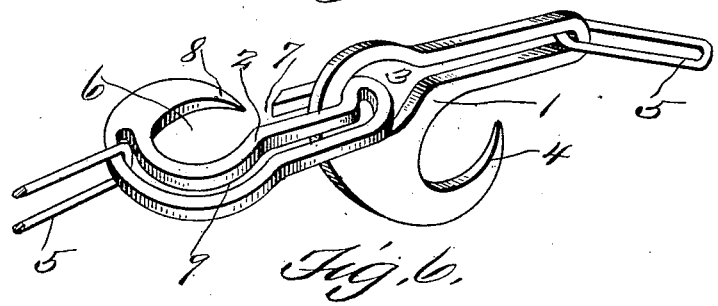
Fig. 6.
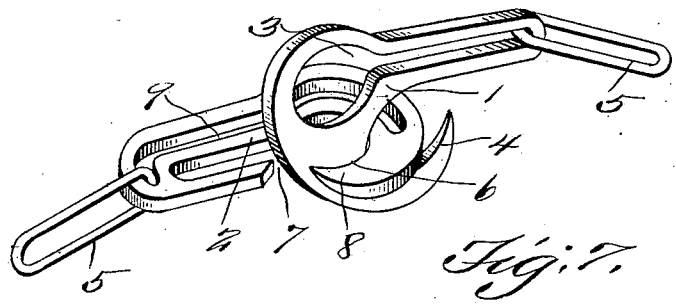
Fig. 7.
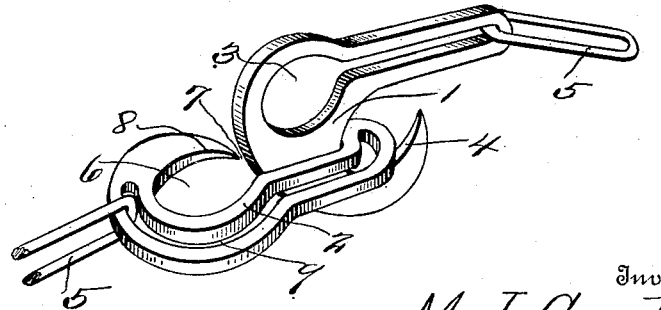
Witnesses
Francis T. Boswell
C. E. Frothingham
Inventor
M. J. Greeley
By D. Swift & Co.
Attorney

UNITED STATES PATENT OFFICE.

MALLIE J. GREELEY, OF THUNDER, IDAHO.

CHAIN-COUPLING DEVICE.

1,042,667. Specification of Letters Patent. Patented Oct. 29, 1912.

Application filed January 13, 1912. Serial No. 671,134.

*To all whom it may concern:*

Be it known that I, MALLIE J. GREELEY, a citizen of the United States, residing at Thunder, in the county of Boise and State of Idaho, have invented a new and useful Chain-Coupling Device; and I do hereby declare the following to be a full, clear, and exact description of the invention, such as will enable others skilled in the art to which it appertains to make and use the same.

This invention relates to a new and useful coupling device comprising coöperating hooks, for connecting chains or the like.

The principal object of this improved device is to provide a pair of coöperating hooks, whereby one or more connections may be made for coupling the ends of a chain together, in such wise as to take up the slack and to draw the chain or the like taut.

The invention comprises further features and combination of parts, as hereinafter set forth, shown in the drawings and claimed.

In the drawings:—Figures 1 and 1ª are perspective views showing the two hooks separated. Fig. 2 is a perspective view showing one connection of the two hooks. Fig. 3 is a perspective view showing a second connection. Fig. 4 is a perspective view showing a third connection of the hooks. Fig. 5 is a perspective view showing a fourth connection. Fig. 6 is a perspective view illustrating a fifth connection. Fig. 7 is a perspective view showing a sixth connection.

Referring to the drawings 1 designates a jews' harp shaped hook, while 2 denotes the coöperating hook. The hooks are connected to the ends of the chains, as shown in the drawings.

The hook 1 is provided with a key hole shaped opening 3, and an offset hook 4. One of the links of the chain 5 connects to the hook 1 in the opening 3. The hook 2 is also formed with a key hole shaped opening 6. The side portion of the hook 2 is cut away, as shown at 7, through which the hook 1 may be inserted, so as to connect the same to the hook 2 in one or more ways. By cutting the hook away in this manner the curved point 8 is formed, which is similar to the hook 4. The hook 2 is formed with a slot 9, which conforms substantially to the shape of the key hole opening 6. The other end of the chain connects to the hook 2, by virtue of the slot 9. The links of the chain which connect to both hooks may be moved from one end to the other of the hooks, by virtue of the key hole shaped opening 3 and slot 9.

Upon an examination of the drawings it will be clearly seen how the two hooks may be adjustably connected in different positions, so as to utilize the slack in the chain.

The invention having been set forth, what is claimed as new and useful is:—

In combination, a pair of coöperating hooks, one being jews' harp shaped and having a key hole shaped opening and provided with an offset hook, the other hook being elongated and having a key hole shaped opening, one wall of which being cut away, to permit the jews' harp shaped hook to be received therein, the elongated hook having an elongated slot in which one of the links of a chain may be arranged, the elongated slot being shaped to conform substantially to the contour of the key hole shaped opening, and a chain having one of its links arranged in the key hole shaped opening of the jews' harp shaped hook.

In testimony whereof I have signed my name to this specification in the presence of two subscribing witnesses.

MALLIE J. GREELEY.

Witnesses:
 JOHN S. LOGUE,
 ROBERT DEALY.

---

Copies of this patent may be obtained for five cents each, by addressing the "Commissioner of Patents, Washington, D. C."